(12) United States Patent
Seo et al.

(10) Patent No.: US 7,826,720 B2
(45) Date of Patent: Nov. 2, 2010

(54) RECORDING MEDIUM HAVING DATA STRUCTURE FOR MANAGING RECORDING AND REPRODUCTION OF MULTIPLE PATH DATA RECORDED THEREON AND RECORDING AND REPRODUCING METHODS AND APPARATUS

(75) Inventors: Kang Soo Seo, Kyunggi-do (KR); Sung Wan Park, Suwon-si (KR); Mi Hyun Kim, Seoul (KR); Sung Ryun Cho, Seoul (KR); Byung Jin Kim, Kyunggi-do (KR); Soung Hyun Um, Kyunggi-do (KR)

(73) Assignee: LG Electronics, Inc., Seoul (KR)

( * ) Notice: Subject to any disclaimer, the term of this patent is extended or adjusted under 35 U.S.C. 154(b) by 966 days.

(21) Appl. No.: 10/607,984

(22) Filed: Jun. 30, 2003

(65) Prior Publication Data
US 2004/0001700 A1    Jan. 1, 2004

(30) Foreign Application Priority Data
Jun. 28, 2002    (KR) .................... 10-2002-0036651

(51) Int. Cl.
*H04N 5/00*    (2006.01)
*H04N 9/00*    (2006.01)
*H04N 11/00*    (2006.01)
*H04N 9/79*    (2006.01)
*H04N 7/00*    (2006.01)

(52) U.S. Cl. .......................... 386/126; 386/1; 386/45; 386/95; 386/125; 386/105; 386/106

(58) Field of Classification Search .................... 386/1, 386/45, 95, 125–126, 105–106
See application file for complete search history.

(56) References Cited

U.S. PATENT DOCUMENTS

| | | | |
|---|---|---|---|
| 5,521,898 | A | 5/1996 | Ogasawara |
| 5,559,808 | A | 9/1996 | Kostreski et al. |
| 5,602,956 | A | 2/1997 | Suzuki et al. |
| 5,651,010 | A | 7/1997 | Kostreski et al. |
| 5,729,549 | A | 3/1998 | Kostreski et al. |
| 5,732,185 | A | 3/1998 | Hirayama et al. |
| 5,742,569 | A | 4/1998 | Yamamoto et al. |

(Continued)

FOREIGN PATENT DOCUMENTS

CA    2377690    1/2001

(Continued)

OTHER PUBLICATIONS

International Search Report issued Oct. 9, 2003 in International Application No. PCT/KR03/01276.

(Continued)

*Primary Examiner*—Thai Tran
*Assistant Examiner*—Daquan Zhao
(74) *Attorney, Agent, or Firm*—Harness, Dickey & Pierce, P.L.C.

(57) ABSTRACT

The recording medium includes at least one navigation area storing navigation management information for managing reproduction of the multiple reproduction path video data recorded on the recording medium. The navigation area has a plurality of angle change recording information corresponding to each of a plurality of data blocks.

25 Claims, 7 Drawing Sheets

U.S. PATENT DOCUMENTS

| | | | |
|---|---|---|---|
| 5,747,136 A | 5/1998 | Shono et al. | |
| 5,771,334 A | 6/1998 | Yamauchi et al. | |
| 5,784,528 A | 7/1998 | Yamane et al. | |
| 5,819,003 A * | 10/1998 | Hirayama et al. | 386/95 |
| 5,821,885 A | 10/1998 | Wise et al. | |
| 5,835,493 A | 11/1998 | Magee et al. | |
| 5,854,873 A | 12/1998 | Mori et al. | |
| 5,870,523 A * | 2/1999 | Kikuchi et al. | 386/95 |
| 5,877,817 A | 3/1999 | Moon et al. | |
| 5,884,004 A * | 3/1999 | Sato et al. | 386/98 |
| 5,895,124 A * | 4/1999 | Tsuga et al. | 386/98 |
| 5,909,257 A | 6/1999 | Ohishi et al. | |
| 5,913,010 A | 6/1999 | Kaneshige et al. | |
| 5,940,255 A | 8/1999 | Uwabo et al. | |
| 5,949,792 A | 9/1999 | Yasuda et al. | |
| 5,953,187 A | 9/1999 | Uwabo et al. | |
| 5,966,352 A | 10/1999 | Sawabe et al. | |
| 5,987,126 A | 11/1999 | Okuyama et al. | |
| 5,999,698 A | 12/1999 | Nakai et al. | |
| 6,031,962 A | 2/2000 | Sawabe et al. | |
| 6,035,095 A | 3/2000 | Kaneshige et al. | |
| 6,064,796 A | 5/2000 | Nakamura et al. | |
| 6,067,400 A | 5/2000 | Saeki et al. | |
| 6,167,189 A | 12/2000 | Taira et al. | |
| 6,181,870 B1 | 1/2001 | Okada et al. | |
| 6,181,872 B1 | 1/2001 | Yamane et al. | |
| 6,185,365 B1 | 2/2001 | Murase et al. | |
| 6,195,726 B1 | 2/2001 | Hogan | |
| 6,219,488 B1 | 4/2001 | Mori et al. | |
| 6,222,805 B1 | 4/2001 | Mori et al. | |
| 6,285,825 B1 | 9/2001 | Miwa et al. | |
| 6,321,027 B2 | 11/2001 | Honjo | |
| 6,336,002 B1 | 1/2002 | Yamauchi et al. | |
| 6,343,062 B1 | 1/2002 | Furukawa et al. | |
| 6,351,442 B1 | 2/2002 | Tagawa et al. | |
| 6,353,613 B1 | 3/2002 | Kubota et al. | |
| 6,360,055 B1 | 3/2002 | Kaneshige et al. | |
| 6,377,747 B1 | 4/2002 | Murase et al. | |
| 6,385,388 B1 | 5/2002 | Lewis et al. | |
| 6,385,389 B1 | 5/2002 | Maruyama et al. | |
| 6,385,394 B1 | 5/2002 | Okada et al. | |
| 6,385,398 B1 | 5/2002 | Matsumoto | |
| 6,393,196 B1 | 5/2002 | Yamane et al. | |
| 6,393,574 B1 | 5/2002 | Kashiwagi et al. | |
| 6,415,101 B1 | 7/2002 | Decarmo et al. | |
| 6,424,797 B1 | 7/2002 | Murase et al. | |
| 6,445,872 B1 | 9/2002 | Sano et al. | |
| 6,470,140 B1 | 10/2002 | Sugimoto et al. | |
| 6,470,460 B1 | 10/2002 | Kashiwagi et al. | |
| 6,480,669 B1 | 11/2002 | Tsumagari et al. | |
| 6,504,996 B1 * | 1/2003 | Na et al. | 386/125 |
| 6,515,101 B1 | 2/2003 | Sheares | |
| 6,546,195 B2 | 4/2003 | Kashiwagi et al. | |
| 6,556,774 B2 * | 4/2003 | Tsumagari et al. | 386/95 |
| 6,564,006 B1 | 5/2003 | Mori et al. | |
| 6,567,608 B2 | 5/2003 | Mori et al. | |
| 6,573,819 B1 | 6/2003 | Oshima et al. | |
| 6,584,277 B2 | 6/2003 | Tsumagari et al. | |
| 6,603,517 B1 | 8/2003 | Shen et al. | |
| 6,618,396 B1 | 9/2003 | Kondo et al. | |
| 6,654,543 B2 | 11/2003 | Ando et al. | |
| 6,788,883 B1 | 9/2004 | Park et al. | |
| 6,801,713 B1 | 10/2004 | Yagawa et al. | |
| 6,901,078 B2 | 5/2005 | Morris | |
| 6,904,227 B1 | 6/2005 | Yamamoto et al. | |
| 7,024,102 B1 | 4/2006 | Inoshita et al. | |
| 7,072,573 B2 | 7/2006 | Okada et al. | |
| 7,106,946 B1 | 9/2006 | Kato | |
| 7,124,303 B2 | 10/2006 | Candelore et al. | |
| 7,236,687 B2 | 6/2007 | Kato et al. | |
| 7,245,825 B2 | 7/2007 | Kikuchi et al. | |
| 2001/0033517 A1 | 10/2001 | Ando et al. | |
| 2001/0038745 A1 | 11/2001 | Sugimoto et al. | |
| 2001/0043790 A1 | 11/2001 | Saeki et al. | |
| 2001/0053280 A1 | 12/2001 | Yamauchi et al. | |
| 2002/0015383 A1 | 2/2002 | Ueno | |
| 2002/0015581 A1 | 2/2002 | Ando et al. | |
| 2002/0021761 A1 | 2/2002 | Zhang et al. | |
| 2002/0031336 A1 | 3/2002 | Okada et al. | |
| 2002/0044757 A1 | 4/2002 | Kawamura et al. | |
| 2002/0046328 A1 | 4/2002 | Okada | |
| 2002/0076201 A1 | 6/2002 | Tsumagari et al. | |
| 2002/0097981 A1 | 7/2002 | Seo et al. | |
| 2002/0097984 A1 | 7/2002 | Abecassis | |
| 2002/0106196 A1 | 8/2002 | Yamauchi et al. | |
| 2002/0126991 A1 | 9/2002 | Kawamura et al. | |
| 2002/0127002 A1 | 9/2002 | Mori et al. | |
| 2002/0131767 A1 | 9/2002 | Auwens et al. | |
| 2002/0145702 A1 | 10/2002 | Kato et al. | |
| 2002/0145708 A1 | 10/2002 | Childers et al. | |
| 2002/0150383 A1 | 10/2002 | Kato et al. | |
| 2002/0159368 A1 | 10/2002 | Noda et al. | |
| 2002/0180803 A1 | 12/2002 | Kaplan et al. | |
| 2002/0196365 A1 | 12/2002 | Cho et al. | |
| 2002/0197059 A1 | 12/2002 | Cho et al. | |
| 2003/0002194 A1 | 1/2003 | Andoh | |
| 2003/0026597 A1 | 2/2003 | Cho et al. | |
| 2003/0113096 A1 * | 6/2003 | Taira et al. | 386/46 |
| 2003/0118327 A1 | 6/2003 | Um et al. | |
| 2003/0123849 A1 | 7/2003 | Nallur et al. | |
| 2003/0133509 A1 | 7/2003 | Yanagihara et al. | |
| 2003/0161615 A1 | 8/2003 | Tsumagari et al. | |
| 2003/0221055 A1 | 11/2003 | Okada | |
| 2003/0235403 A1 | 12/2003 | Seo et al. | |
| 2003/0235404 A1 | 12/2003 | Seo et al. | |
| 2003/0235405 A1 | 12/2003 | Seo et al. | |
| 2004/0068606 A1 | 4/2004 | Kim et al. | |
| 2004/0086261 A1 | 5/2004 | Hanes | |
| 2004/0156621 A1 | 8/2004 | Seo et al. | |
| 2004/0179819 A1 | 9/2004 | Cho et al. | |
| 2004/0179820 A1 | 9/2004 | Kashiwahi et al. | |
| 2004/0179827 A1 | 9/2004 | Cho et al. | |
| 2004/0247290 A1 | 12/2004 | Seo et al. | |
| 2004/0252975 A1 | 12/2004 | Cho et al. | |
| 2005/0019007 A1 | 1/2005 | Kato et al. | |
| 2005/0025459 A1 | 2/2005 | Kato et al. | |
| 2005/0025461 A1 * | 2/2005 | Kato et al. | 386/95 |
| 2005/0036763 A1 | 2/2005 | Kato et al. | |
| 2005/0232111 A1 | 10/2005 | Sawabe et al. | |
| 2005/0254363 A1 | 11/2005 | Hamada et al. | |
| 2006/0098936 A1 | 5/2006 | Ikeda et al. | |
| 2006/0222340 A1 | 10/2006 | Yamauchi et al. | |
| 2007/0031122 A1 | 2/2007 | Yamagata et al. | |
| 2008/0019675 A1 | 1/2008 | Hamasaka et al. | |

FOREIGN PATENT DOCUMENTS

| | | |
|---|---|---|
| CN | 1134583 | 10/1996 |
| CN | 1134583 A | 10/1996 |
| CN | 1163673 | 2/1997 |
| CN | 1197574 | 4/1997 |
| CN | 1197573 A | 10/1998 |
| CN | 1197574 | 10/1998 |
| CN | 1150293 A | 5/1999 |
| CN | 1220458 A | 6/1999 |
| CN | 1251680 | 7/1999 |
| CN | 1237852 A | 12/1999 |
| CN | 1317200 | 2/2000 |
| CN | 1251461 A | 4/2000 |
| CN | 1272209 A | 11/2000 |
| CN | 1146902 C | 4/2004 |
| CN | 1150757 C | 5/2004 |
| EP | 0689206 | 12/1995 |
| EP | 0 723 216 A2 | 7/1996 |

| | | |
|---|---|---|
| EP | 1120789 | 3/1997 |
| EP | 0 788 105 A1 | 8/1997 |
| EP | 0 798 722 A2 | 10/1997 |
| EP | 0 814 475 A1 | 12/1997 |
| EP | 0 836 183 A2 | 4/1998 |
| EP | 0 847 195 A1 | 6/1998 |
| EP | 0847198 | 6/1998 |
| EP | 0 873 022 A2 | 10/1998 |
| EP | 0 875 856 A1 | 11/1998 |
| EP | 0 896 337 | 2/1999 |
| EP | 0 903 744 A2 | 3/1999 |
| EP | 0 847 198 B1 | 4/1999 |
| EP | 0 917 355 A1 | 5/1999 |
| EP | 0 836 189 B1 | 8/1999 |
| EP | 0 737 980 B1 | 9/1999 |
| EP | 0 940 983 A1 | 9/1999 |
| EP | 0949825 | 10/1999 |
| EP | 0 967 604 | 12/1999 |
| EP | 0961279 | 12/1999 |
| EP | 1003338 A2 | 5/2000 |
| EP | 1043724 | 10/2000 |
| EP | 0 918 438 B1 | 8/2001 |
| EP | 1 126 454 A1 | 8/2001 |
| EP | 1 198 132 A1 | 4/2002 |
| EP | 1 198 133 A1 | 4/2002 |
| EP | 1 256 954 | 11/2002 |
| EP | 1 202 568 B1 | 7/2003 |
| EP | 0 920 203 B1 | 9/2004 |
| EP | 1 469 677 A1 | 10/2004 |
| EP | 1 081 885 B1 | 3/2005 |
| EP | 1553769 | 7/2005 |
| GB | 2 351 888 | 1/2001 |
| JP | 64-003781 | 1/1989 |
| JP | 01-116819 | 5/1989 |
| JP | 08-088832 | 4/1996 |
| JP | 08-235833 | 9/1996 |
| JP | 8-511146 | 11/1996 |
| JP | 09-023403 | 1/1997 |
| JP | 09-251759 | 9/1997 |
| JP | 9-259527 | 10/1997 |
| JP | 10-27461 | 1/1998 |
| JP | 10-032780 | 2/1998 |
| JP | 10-040667 | 2/1998 |
| JP | 10-051737 | 2/1998 |
| JP | 10-155138 | 6/1998 |
| JP | 10-255443 | 9/1998 |
| JP | 10-269698 | 10/1998 |
| JP | 10-271449 | 10/1998 |
| JP | 10-299698 | 11/1998 |
| JP | 10-340570 | 12/1998 |
| JP | 11-41563 | 2/1999 |
| JP | 11-041563 | 2/1999 |
| JP | 11-066813 | 3/1999 |
| JP | 11-103444 | 4/1999 |
| JP | 11-134812 | 5/1999 |
| JP | 11-185463 | 7/1999 |
| JP | 11-259976 | 9/1999 |
| JP | 11-346341 | 12/1999 |
| JP | 11341443 | 12/1999 |
| JP | 2000-030414 | 1/2000 |
| JP | 2000-041066 | 2/2000 |
| JP | 2000-069437 | 3/2000 |
| JP | 2000-113602 | 4/2000 |
| JP | 2000-149514 | 5/2000 |
| JP | 2000-235779 | 8/2000 |
| JP | 2000-293938 | 10/2000 |
| JP | 2000-299836 | 10/2000 |
| JP | 2000-348442 | 12/2000 |
| JP | 2001-024973 | 1/2001 |
| JP | 2001-024985 | 1/2001 |
| JP | 2001-067802 | 3/2001 |
| JP | 2001-111929 | 4/2001 |
| JP | 2001-111944 | 4/2001 |
| JP | 2001-111960 | 4/2001 |
| JP | 2001-169246 | 6/2001 |
| JP | 2001-297535 | 10/2001 |
| JP | 2001-332006 | 11/2001 |
| JP | 2002-083486 | 3/2002 |
| JP | 2002-112179 | 4/2002 |
| JP | 2002-150685 | 5/2002 |
| JP | 2002-158971 | 5/2002 |
| JP | 2002-158972 | 5/2002 |
| JP | 2002-158974 | 5/2002 |
| JP | 2002-171472 | 6/2002 |
| JP | 2002-176623 | 6/2002 |
| JP | 2002-216460 | 8/2002 |
| JP | 2002-222581 | 8/2002 |
| JP | 2003-087744 | 3/2003 |
| JP | 2003-116100 | 4/2003 |
| JP | 2004-48396 | 2/2004 |
| JP | 2005-252432 | 9/2005 |
| JP | 2006-503400 | 1/2006 |
| KR | 1019990022858 A | 3/1999 |
| KR | 1020000031861 A | 6/2000 |
| KR | 1020000055028 A | 9/2000 |
| KR | 1020000056179 A | 9/2000 |
| KR | 1020000065876 A | 11/2000 |
| KR | 100294884 | 2/2001 |
| KR | 1020010022702 A | 3/2001 |
| KR | 100294884 | 4/2001 |
| KR | 1020010098007 A | 11/2001 |
| KR | 1020010098101 A | 11/2001 |
| KR | 1020010107578 A | 12/2001 |
| KR | 1020020006674 A | 1/2002 |
| KR | 1020020020919 A | 3/2002 |
| KR | 1020020097454 A | 12/2002 |
| KR | 1020020097455 A | 12/2002 |
| KR | 1020040000290 A | 1/2004 |
| KR | 1020040030992 A | 4/2004 |
| KR | 1020040030994 A | 4/2004 |
| KR | 1020040030995 A | 4/2004 |
| KR | 1020040041581 A | 5/2004 |
| TW | 391548 | 5/2000 |
| WO | WO 97/13365 | 4/1997 |
| WO | WO97/13366 | 4/1997 |
| WO | WO 97/31374 | 8/1997 |
| WO | WO 97/39451 | 10/1997 |
| WO | WO 98/00952 | 1/1998 |
| WO | WO 99/08281 | 2/1999 |
| WO | WO 00/02195 | 1/2000 |
| WO | WO 00/42515 | 7/2000 |
| WO | WO 00/60598 | 10/2000 |
| WO | WO 00/62295 | 10/2000 |
| WO | WO 01/80239 | 10/2001 |
| WO | 01/82610 A1 | 11/2001 |
| WO | WO 01/82604 A1 | 11/2001 |
| WO | WO 01/82606 A1 | 11/2001 |
| WO | WO 01/82609 A1 | 11/2001 |
| WO | WO 2004/001748 | 12/2003 |
| WO | WO 2004/001750 A1 | 12/2003 |
| WO | WO 2004/001753 A1 | 12/2003 |
| WO | WO 2004/042723 | 5/2004 |
| WO | WO 2004/045206 A1 | 5/2004 |
| WO | WO 2004/075183 A1 | 9/2004 |
| WO | WO 2004/077417 A1 | 9/2004 |
| WO | WO 2004/079736 A1 | 9/2004 |
| WO | WO 2004/081939 A1 | 9/2004 |
| WO | WO 2004/086371 A1 | 10/2004 |

OTHER PUBLICATIONS

Search Report issued Aug. 13, 2008 by the European Patent Office in counterpart European Patent Application No. 03811139.9-2223.
Office Action issued Jul. 25, 2008 by the USPTO in counterpart U.S. Appl. No. 10/642,635.

Office Action issued Apr. 22, 2008 by the Japanese Patent Office in counterpart Japanese Patent Application No. 2006-196199.
Office Action issued Jul. 9, 2008 by the U.S. Patent and Trademark Office in counterpart U.S. Appl. No. 10/176,367.
European Patent Office Search Report dated Mar. 31, 2008, for corresponding European Patent Application No. 03761863.4-2223.
Japanese Patent Office Action dated May 7, 2008, for corresponding Japanese Patent Application No. 2004-517390.
Japanese Patent Office Action dated May 7, 2008, for corresponding Japanese Patent Application No. 2004-517368.
Office Action issued May 20, 2008 by the Japanese Patent Office in counterpart Japanese Patent Application No. 2004-551246.
Office Action issued Nov. 4, 2008 by the Japanese Patent Office in counterpart Japanese Patent Application No. 2004-517390 (with English language translation).
Office Action issued Apr. 2, 2009 by the USPTO in counterpart U.S. Appl. No. 10/642,693.
Office Action for Australian patent application No. 2003243049 dated Jul. 9, 2009.
Office Action for Japanese patent application No. 2004-553244 dated Jul. 17, 2009 (English language translation.
Office Action for Japanese patent application No. 2004-515215 dated Jul. 7, 2009.
Office Action for U.S. Appl. No. 10/702,557 dated Jun. 25, 2009.
Chinese Office Action dated Mar. 23, 2007.
Chinese Office Action dated Jul. 7, 2006.
Russian Office Action dated Sep. 28, 2006.
Taiwanese Search Report dated Feb. 22, 2007.
Japanese Office Action dated Jan. 22, 2008.
United States Office Action dated Jan. 28, 2008.
United States Office Action dated Jan. 2, 2008.
Chinese Office Action dated Dec. 14, 2007.
European Search Report dated Dec. 28, 2007.
European Search Report dated Jan. 2, 2008.
European Search Report dated Nov. 30, 2009 for corresponding application No. 03811549.9-1247.
Australian Office Action dated Dec. 14, 2009.
USPTO Office Action dated Dec. 31, 2009.
European Search Report for corresponding Application No. 03761845.1 dated Feb. 3, 2010.
Office Action issued Jun. 1, 2007 by the U.S. Patent and Trademark Office in counterpart U.S. Appl. No. 10/702,557.
Search Report issued Oct. 8, 2009 by the European Patent Office in counterpart European Patent Application No. 03811959.0-2223.
Search Report issued Oct. 8, 2009 by the European Patent Office in counterpart European Patent Application No. 03733603.9-2223.
Steinmetz R: "Multimedia file systems survey: approaches for continuous media disk scheduling" Computer Communications, Elsevier Science Publishers BV, Amsterdam, NL, vol. 18, No. 3, Mar. 1, 1995 pp. 133-144, XP004032495 ISSN 0140-3664.
Venkat Rangan P et al: "Designing File Systems for Digital Video and Audio" Operating Systems Revies, ACM, New York, NY, US, vol. 25, No. 5, Jan. 1, 1991, pp. 81-94 XP000288304 ISSN: 0163-5980.
Rangan P V et al: "Techniques for multimedia synchronization in network file systems" Computer Communications. Elsevier Science Publishers BV, Amsterdam, NL. vol. 16, No. 3, Mar. 1, 1993 pp. 168-176, XP024226515 ISSN: 0140-3664.
Niranjan T N et al: "Implementation and evaluation of a multimedia file system" Multimedia Computing and Systems '97. Proceedings., IEEE International Conference on Ottawa, Ont., Canada Jun. 3-6, 1997, Los Alamitos, CA, USA, IEEE Comput. Soc. US, 3 Jun. 19.
Japanese Office Action for corresponding Application No. 2004-555088 dated Jun. 25, 2010 (no English language translation).
Indian Office Action dated Jun. 14, 2010 for corresponding Application No. 2003/DELPN/2004.

* cited by examiner

FIG. 5

*EP_map_for_one_stream_PID*

| Syntax |
|---|
| EP_map_for_one_stream_PID *(EP_stream_type,Nc,Nf)* { |
| EP_fine_table_start_address |
| for (i=0; i<Nc; i++) { |
| ref_to_EP_fine_id *[i]* |
| PTS_EP_coarse *[i]* |
| SPN_EP_coarse *[i]* |
| } |
| ⋮ |
| for (EP_fine_id = 0; EP_fine_id < Nf; EP_fine_id ++) { |
| EP_video_type *[EP_fine_id]* |
| I_end_position_offset *[EP_fine_id]* |
| PTS_EP_fine *[EP_fine_id]* |
| SPN_EP_fine *[EP_fine_id]* |
| } |
| } |

FIG. 6

| EP_video_type | I_End_position_offset | PTS_EP_fine‖SPN_EP_fine | Note |
|---|---|---|---|
| 0 | 001 ~ 111 | Same as BD-RW | TIP Packet Start SPN |
| 1 | 000 | First_I_End_relative_SPN | From TIP Packet |
| 1 | 001 | First_P_End_relative_SPN | From TIP Packet |
| 1 | 010 | Second_P_End_relative_SPN | From TIP Packet |
| 1 | 100 | AC(Angle Change) or ILVU_End_relative_SPN | From TIP Packet |

RECORDING MEDIUM HAVING DATA STRUCTURE FOR MANAGING RECORDING AND REPRODUCTION OF MULTIPLE PATH DATA RECORDED THEREON AND RECORDING AND REPRODUCING METHODS AND APPARATUS

BACKGROUND OF THE INVENTION

1. Field of the Invention

The present invention relates to a recording medium having a data structure for managing reproduction of at least multiple reproduction path video data recorded thereon as well as methods and apparatuses for reproduction and recording.

2. Description of the Related Art

The standardization of new high-density read only and rewritable optical disks capable of recording large amounts of high-quality video and audio data has been progressing rapidly and new optical disk related products are expected to be commercially available on the market in the near future. The Blu-ray Disk Rewritable (BD-RW) is one example of these new optical disks.

FIG. 1 illustrates the file structure of the BD-RW. As shown, the data structure includes a root directory that contains at least one BDAV directory. The BDAV directory includes files such as 'info.bdav', 'menu.tidx', and 'mark.tidx', a PLAYLIST subdirectory in which playlist files (*.rpls and *.vpls) are stored, a CLIPINF subdirectory in which clip information files (*.clpi) are stored, and a STREAM subdirectory in which MPEG2-formatted A/V stream clip files (*.m2ts) corresponding to the clip information files are stored. In addition to illustrating the data structure of the optical disk, FIG. 1 represents the areas of the optical disk. For example, the general information file info.bdav is stored in a general information area or areas on the optical disk.

Because the BD-RW data structure and disk format as illustrated in FIG. 1 is well-known and readily available, only a brief overview of the file structure will be provided in this disclosure.

As alluded to above, the STREAM directory includes MPEG2-formatted A/V stream files called clips. The STREAM directory may also include a special type of clip referred to as a bridge-clip A/V stream file. A bridge-clip is used for making seamless connection between two or more presentation intervals selected in the clips, and generally have a small data size compared to the clips. The A/V stream includes source packets of video and audio data. For example, a source packet of video data includes a header and a transport packet. A source packet includes a source packet number, which is generally a sequentially assigned number that serves as an address for accessing the source packet. Transport packets include a packet identifier (PID). The PID identifies the sequence of transport packets to which a transport packet belongs. Each transport packet in the sequence will have the same PID.

The CLIPINF directory includes a clip information file associated with each A/V stream file. The clip information file indicates, among other things, the type of A/V stream associated therewith, sequence information, program information and timing information. The sequence information describes the arrival time basis (ATC) and system time basis (STC) sequences. For example, the sequence information indicates, among other things, the number of sequences, the beginning and ending time information for each sequence, the address of the first source packet in each sequence and the PID of the transport packets in each sequence. A sequence of source packets in which the contents of a program is constant is called a program sequence. The program information indicates, among other things, the number of program sequences, the starting address for each program sequence, and the PID(s) of transport packets in a program sequence.

The timing information is referred to as characteristic point information (CPI). One form of CPI is the entry point (EP) map. The EP map maps a presentation time stamp (e.g., on an arrival time basis (ATC) and/or a system time basis (STC) to a source packet address (i.e., source packet number).

The PLAYLIST directory includes one or more playlist files. The concept of a playlist has been introduced to promote ease of editing/assembling clips for playback. A playlist file is a collection of playing intervals in the clips. Each playing interval is referred to as a playitem. The playlist file, among other things, identifies each playitem forming the playlist, and each playitem, among other things, is a pair of IN-point and OUT-point that point to positions on a time axis of the clip (e.g., presentation time stamps on an ATC or STC basis). Expressed another way, the playlist file identifies the playitems, each playitem points to a clip or portion thereof and identifies the clip information file associated with the clip. The clip information file is used, among other things, to map the playitems to the clip of source packets.

A playlist directory may include real playlists (*.rpls) and virtual playlists (*.vpls). A real playlist can only use clips and not bridge-clips. Namely, the real playlist is considered as referring to parts of clips, and therefore, conceptually considered equivalent in disk space to the referred to parts of the clips. A virtual playlist can use both clips and bridge-clips, and therefore, the conceptual considerations of a real playlist do not exist with virtual playlists.

The info.bdav file is a general information file that provides general information for managing the reproduction of the A/V stream recorded on the optical disk. More specifically, the info.bdav file includes, among other things, a table of playlists that identifies the files names of the play list in the PLAYLIST directory of the same BDAV directory.

The menu.tidx, menu.tdt1 and menu.tdt2 files store information related to menu thumbnails. The mark.tidx, mark.tdt1 and mark.tdt2 files store information that relates to mark thumbnails. Because these files are not particularly relevant to the present invention, they will not be discussed further.

The standardization for high-density read-only optical disks such as the Blu-ray ROM (BD-ROM) is still under way. An effective data structure for managing reproduction of video and audio data recorded on the high-density read-only optical disk such as a BD-ROM is not yet available.

SUMMARY OF THE INVENTION

The recording medium has a data structure for managing reproduction of at least multiple reproduction path video data recorded on the record medium. The recording medium includes at least one navigation area storing navigation management information for managing reproduction of the multiple recordation path video data recorded on the recording medium. The at least one navigation area has a plurality of angle change recording information corresponding to each of a plurality of data blocks.

In one exemplary embodiment, the at least one navigation area stores the plurality of angle change recording information in an entry point map.

The invention also includes a method of recording a data structure for managing reproduction of at least multiple reproduction path video data on a recording medium, the steps including recording navigation management information for managing reproduction of multiple reproduction path video data in at least one navigation area of the recording medium, said at least one navigation area having a plurality of angle change recording information corresponding to each of a plurality of data blocks.

BRIEF DESCRIPTION OF THE DRAWINGS

The above features and other advantages of the present invention will be more clearly understood from the following detailed description with the accompanying drawings in which:

FIG. 5 illustrates an exemplary embodiment of a data structure for an entry point map that is recorded and managed by a search information management method for a high-density optical disk in accordance with the present invention;

FIG. 6 illustrates an exemplary embodiment of an entry point map which is recorded and managed by a search information management method for a high-density optical disk in accordance with the present invention;

DETAILED DESCRIPTION OF THE PREFERRED EMBODIMENTS

In order that the invention may be fully understood, preferred embodiments thereof will now be described with reference to the accompanying drawings.

Figure 1:
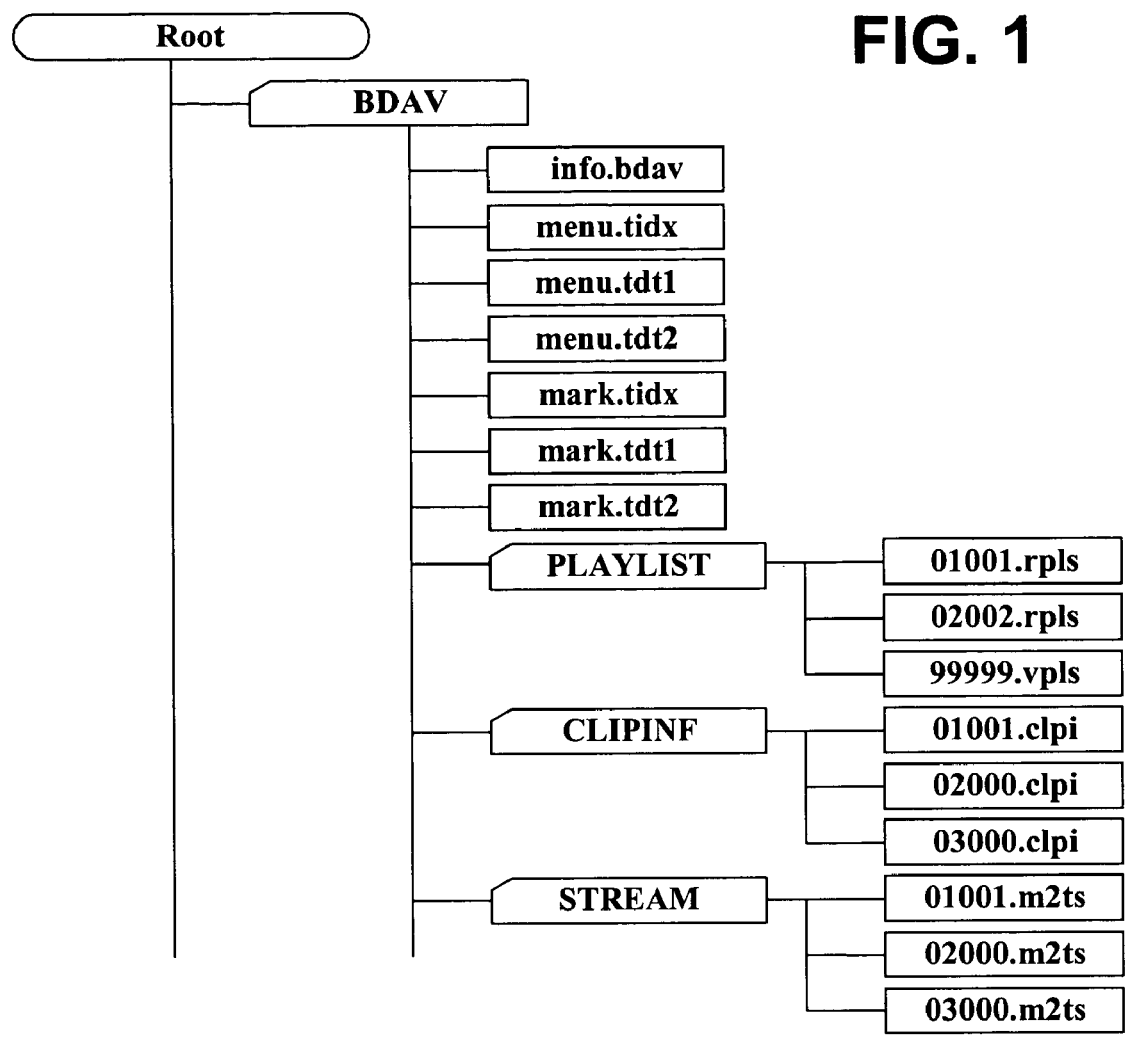
FIG. 1 illustrates the prior art file or data structure of a rewritable optical disk according to the Blu-ray Disc Rewritable (BD-RW) standard.
Figure 2:
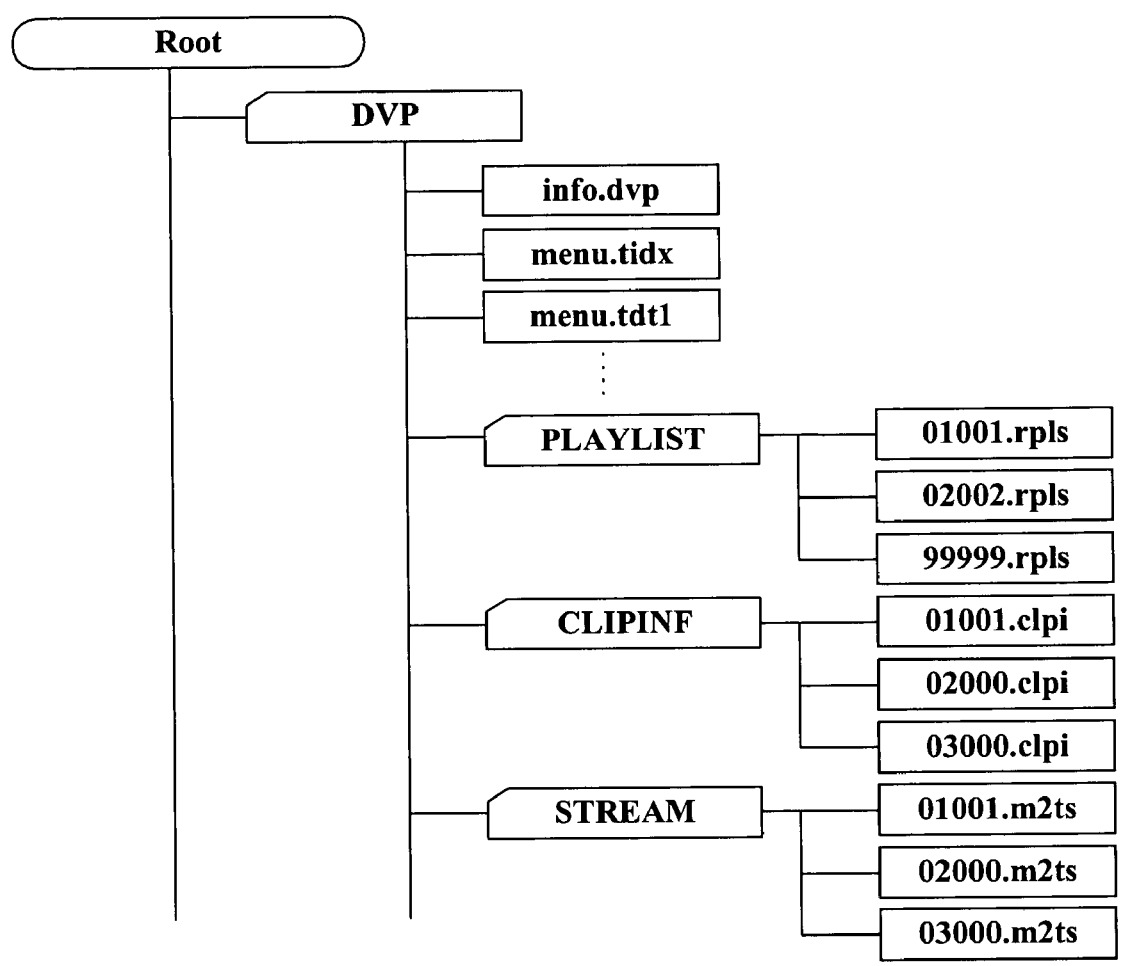
FIG. 2 illustrates an exemplary embodiment of a recording medium file or data structure according to the present invention.

A high-density optical disk, for example, a Blu-ray ROM (BD-ROM) in accordance with the present invention may have a file or data structure for managing reproduction of video and audio data as shown in FIG. 2. Many aspects of the data structure according to the present invention shown in FIG. 2 are similar to that of the BD-RW standard discussed with respect to FIG. 1. As such these aspects will not be described in great detail.

As shown in FIG. 2, the root directory contains at least one DVP directory. The DVP directory includes a general information file info.dvp, menu files menu.tidx, menu.tdt1 among others, a PLAYLIST directory in which playlist files (e.g., real (*.rpls) and virtual (*.vpls)) are stored, a CLIPINF directory in which clip information files (*.clpi) are stored, and a STREAM directory in which MPEG2-formatted A/V stream clip files (*.m2ts), corresponding to the clip information files, are stored.

The STREAM directory includes MPEG2-formatted A/V stream files called clips. The STREAM directory may also include a special type of clip referred to as a bridge-clip A/V stream file. A bridge-clip is used for making seamless connection between two or more presentation intervals selected in the clips, and generally have a small data size compared to the clips. The A/V stream includes source packets of video and audio data. For example, a source packet of video data includes a header and a transport packet. A source packet includes a source packet number, which is generally a sequentially assigned number that serves as an n address for accessing the source packet. Transport packets include a packet identifier (PID). The PID identifies the sequence of transport packets to which a transport packet belongs. Each transport packet in the sequence will have the same PID.

The CLIPINF directory includes a clip information file associated with each A/V stream file. The clip information file indicates, among other things, the type of A/V stream associated therewith, sequence information, program information and timing information. The sequence information describes the arrival time basis (ATC) and system time basis (STC) sequences. For example, the sequence information indicates, among other things, the number of sequences, the beginning and ending time information for each sequence, the address of the first source packet in each sequence and the PID of the transport packets in each sequence. A sequence of source packets in which the contents of a program is constant is called a program sequence. The program information indicates, among other things, the number of program sequences, the starting address for each program sequence, and the PID(s) of transport packets in a program sequence.

The timing information is referred to as characteristic point information (CPI). One form of CPI is the entry point (EP) map. The EP map maps a presentation time stamp (e.g., on an arrival time basis (ATC) and/or a system time basis (STC)) to a source packet address (i.e., source packet number).

The PLAYLIST directory includes one or more playlist files. The concept of a playlist has been introduced to promote ease of editing/assembling clips for playback. A playlist file is a collection of playing intervals in the clips. Each playing interval is referred to as a playitem. The playlist file, among other things, identifies each playitem forming the playlist, and each playitem, among other things, is a pair of IN-point and OUT-point that point to positions on a time axis of the clip (e.g., presentation time stamps on an ATC or STC basis). Expressed in another way, the playlist file identifies playitems, each playitem points to a clip or portion thereof and identifies the clip information file associated with the clip. The clip information file is used, among other things, to map the playitems to the clip of source packets.

A playlist directory may include real playlists (*.rpls) and virtual playlists (*.vpls). A real playlist can only use clips and not bridge-clips. Namely, the real play list is considered as referring to parts of clips, and therefore, conceptually considered equivalent in disk space to the referred to parts of the clips. A virtual playlist can use both clips and bridge-clips, and therefore, the conceptual considerations of a real playlist do not exist with virtual playlists.

The info.dvp file is a general information file that provides general information for managing the reproduction of the A/V streams recorded on the optical disk. More specifically, the info.dvp file includes, among other things, a table of playlists that identifies the file names of the playlists in the PLAYLIST directory. The info.dvp file will be discussed in greater detail below with respect to the embodiments of the present invention.

Figure 3:
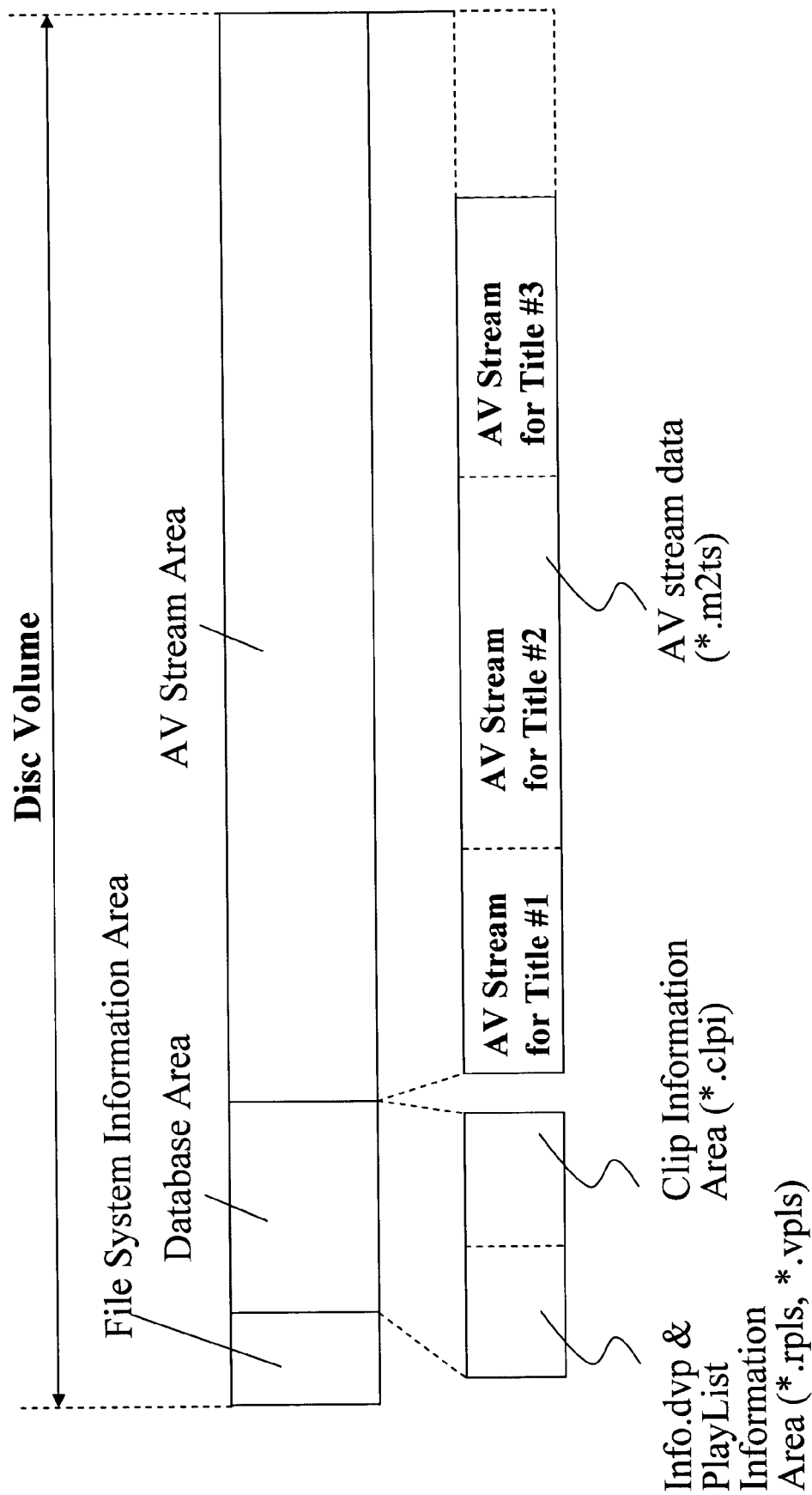
FIG. 3 illustrates an example of a recording medium in accordance with the present invention.

In addition to illustrating the data structure of the recording medium according to an embodiment of the present invention, FIG. 2 represents the areas of the recording medium. For example, the general information file is recorded in one or more general information areas, the playlist directory is recorded in one or more playlist directory areas, each playlist in a playlist directory is recorded in one or more playlist areas of the recording medium, etc. FIG. 3 illustrates an example of a recording medium having the data structure of FIG. 2 stored thereon. As shown, the recording medium includes a file system information area, a data base area and an A/V stream area. The data base area includes a general information file area and playlist information area and a clip information area. The general information file and playlist information area have the general information file recorded in a general information file area thereof, and the PLAYLIST directory and playlist files recorded in a playlist information area thereof. The clip information area has the CLIPINFO directory and associated clip information files recorded therein. The A/V stream area has the A/V streams for the various titles recorded therein.

Video and audio data are typically organized as individual titles; for example, different movies represented by the video and audio data are organized as different titles. Furthermore, a title may be organized into individual chapters in much the same way a book is often organized into chapters.

Because of the large storage capacity of the newer, high-density recording media such as BD-ROM optical disks, different titles, various versions of a title or portions of a title may be recorded, and therefore, reproduced from the recording media. For example, video data representing different camera angles may be recorded on the recording medium. As another example, versions of title or portions thereof associated with different languages may be recorded on the recording medium. As a still further example, a director's version and a theatrical version of a title may be recorded on the recording medium. Or, an adult version, young adult version and young child version (i.e., different parental control versions) of a title or portions of a title may be recorded on the recording medium. Each version represents a different reproduction path, and the video data in these instances is referred to as multiple reproduction path video data. It will be appreciated that the above examples of multiple reproduction path video data are not limiting, and the present invention is applicable to any type or combination of types of multiple reproduction path video data. As will be described in detail below with respect to embodiments of the present invention, the data structures according to the present invention include path management information and/or navigation information for managing reproduction of multiple reproduction path video data recorded on the recording medium.

Figure 4:
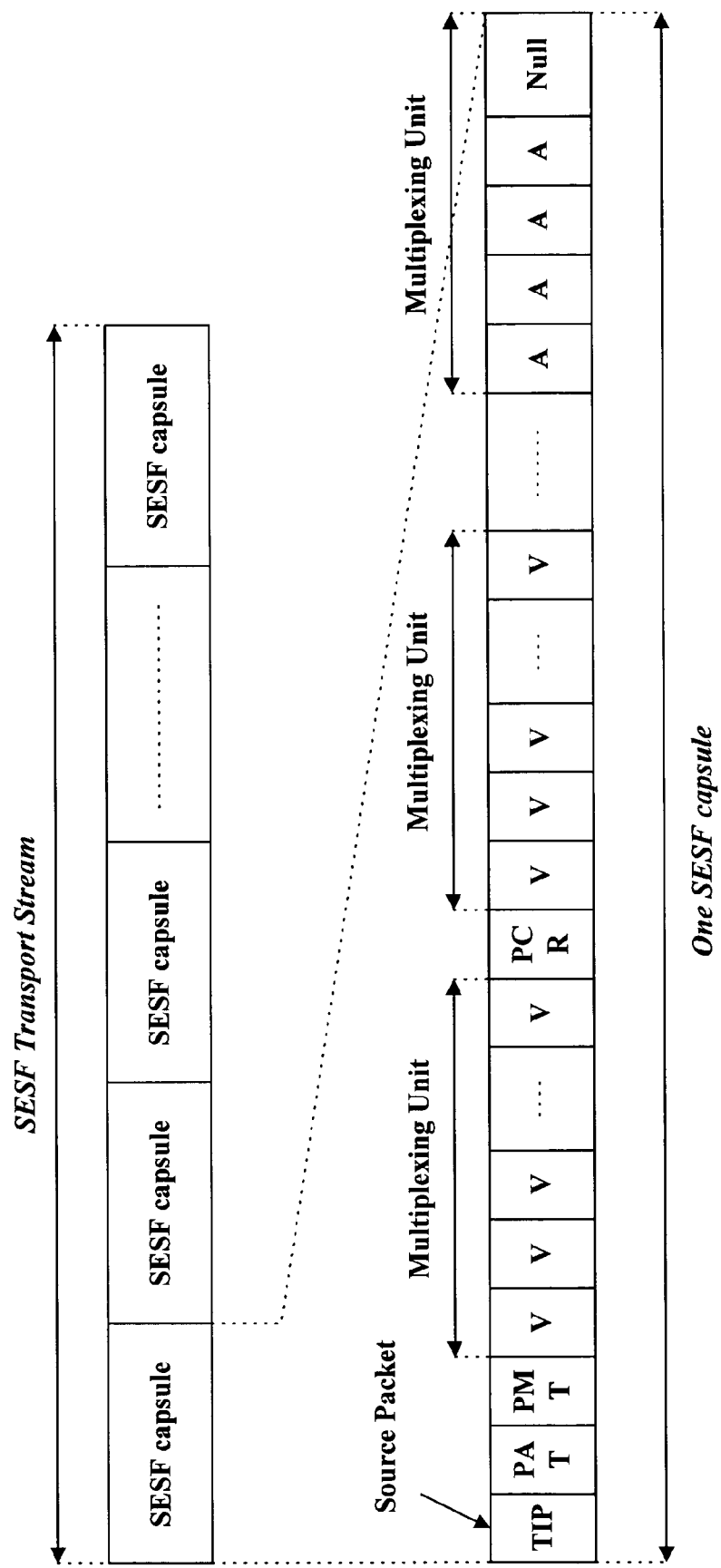
FIG. 4 illustrates a Contained Self-Encoded Stream Format transport stream for use in the data structure according to FIG. 2.

FIG. 4 shows a Self-Encoded Format Transport Stream (SESF) having a plurality of SEFS capsules. Each of the SEFS capsules has a TIP source packet, followed by a multiplexing unit of video data packets "V". One constrained SEFS TS consists of one or more SESF capsules, and each SESP capsule starts with a SESF TIP packet. Every TIP contains audio or video stream information for succeeding source packets. The audio/video stream also contains a program map table (PMT), that is a TS packet that contains the PIDs for each of the elementary streams. A program association table (PAT), which is also a TS packet, carries the PIDs that identify various PMTs.

FIG. 5 illustrates a portion of the clip information file according to an embodiment of the present invention. As shown, the EP_map_for_one_stream_PID entry is used to populate a table of PTS values and addresses for packets having the same PID in a single elementary stream. These tables collectively define an EP map that is part of the data structure's characteristic point information (CPI) that relates the time information in the AV stream with the address information in the AV stream.

In order to reduce the size of the table and to improve the searching performance of the system, the EP_map_for_one_stream_PID is divided into two sub tables: EP_coarse and EP_fine. EP_fine contains the least significant bits (LSB) from the presentation time stamp start and the source packet number start for each of the packets associated with a PID. EP_coarse refers to EP_fine and contains the most significant bits (MSB) of the presentation time stamp start, the source packet number and the EP_fine number that corresponds to the EP_coarse entry having the same presentation time stamp start. The number of entries in the EP_coarse sub table is comparatively less than the EP_fine sub table.

The entry map for EP_map_for_one_stream_PID stores the presentation time stream entry point (PTS_EP_start) and the entry point of address (SPN_EP_start) to manage source packets in an audio/video stream corresponding to the same PID.

The EP_fine_table_start_address is the start address of the first EP_video_type_(EP_fine_id) field in relative byte number from the first byte of the EP_map_for_one_stream_PID( ). The ref_to_EP_fine_id is the EP_fine entry number that contains the PTS_EP_fine that relates to the PTS_EP_coarse immediately following this field. PTS_EP_coarse and SPN_EP_coarse are both derived from the PTS_EP_start for the entry point.

For each EP map entry, the combination of the EP_video_type (EP_fine_id) and I_end_position_offset (EP_fine_id) defines various conditions. For example, if the I_end_position_offset (EP_fine_id) set to a value other than "000", for particular video types, this indicates that the offset address of the end of a video access unit that includes an I-picture pointed to by the SPN_EP_start.

FIG. 6 shows possible combinations of some of the foregoing parameters stored in the EP map that may be used to set certain conditions in the data structure such as a change angle request. In FIG. 6, the various factors shown include the EP_video_type (EP_fine_id), I_end_position_offset (EP_fine_id), PTS_EP_fine and SPN_EP_fine.

Where the EP_video_type is set to "0", the PTS_EP_fine and the SPN_Entry_fine become the values that correspond to TIP packet start SPN of the head of the SESF capsule.

In the second condition, the EP_video_type is set to "1" and the I_end_position_offset is set to "000". The PTS_EP_fine and the SPN_EP_fine are placed into the values that correspond to first I-Picture end relative to source packet number (first_I-end_relative_SPN).

In the third condition, the I-Picture end position offset is '001', the PTS_EP_fine and the SPN_EP_fine become the values that correspond to the first P-picture end relative source packet number (first_P_end_relative_SPN); and when the I-picture end position offset is '010', the PTS_EP_fine and the SPN_EP_fine become the values that correspond to the second P-picture end relative source packet number (second_P_end_relative SPN).

In the fourth condition, when the I-picture end position offset is '100', the PTS_EP_fine and the SPN_EP_fine become the values that correspond to the Angle Change (or AC) or the Interleaved Unit end relative source packet number (ILVU_end_relative_SPN). Namely, this confirms where an angle change is permitted.

Each of the aforementioned conditions are offered to show a more efficient method of recording, reproducing and managing of data on a optical disk by recording certain information in an EP map and using this information to determine critical points in the data structure.

Figure 7:
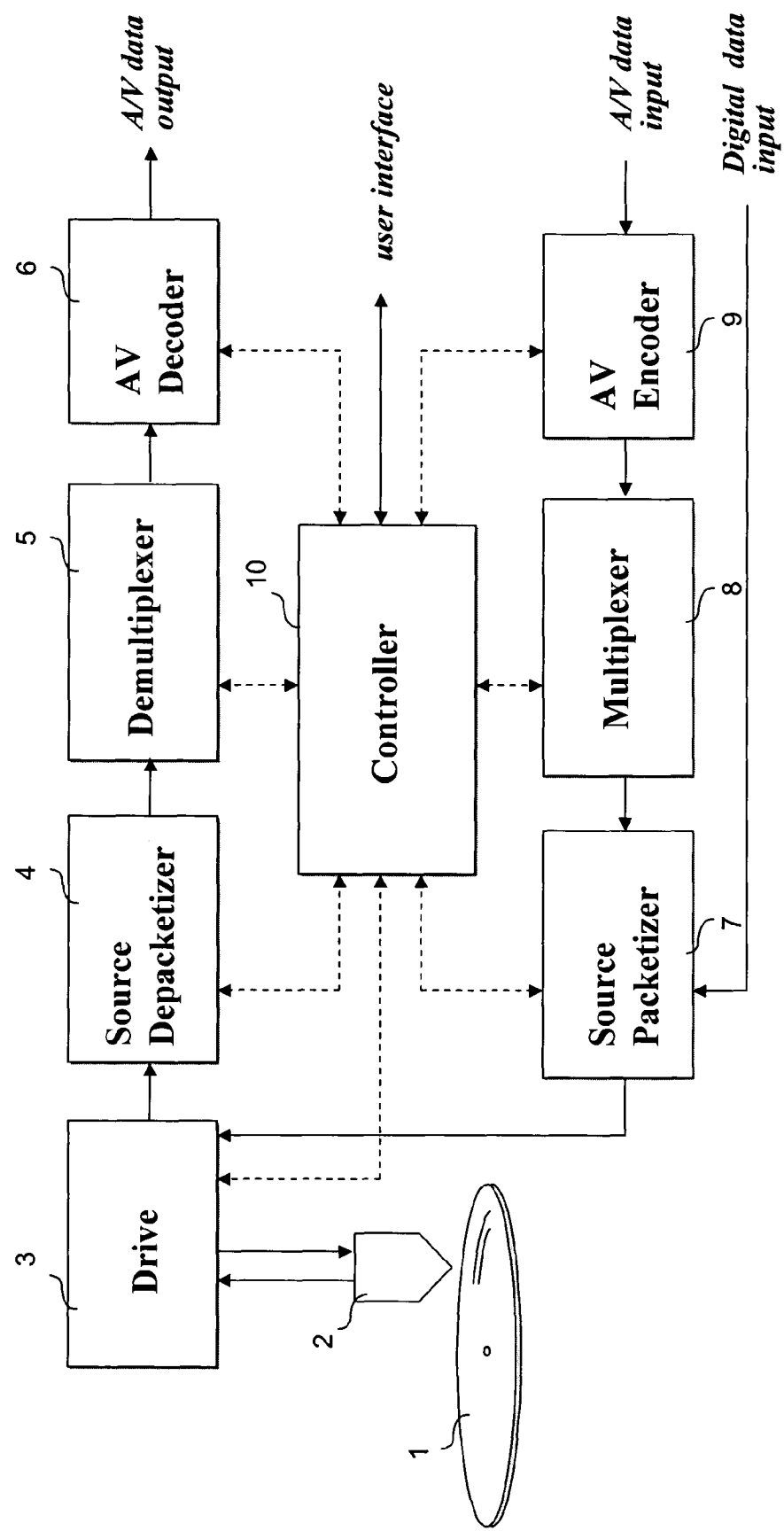
FIG. 7 illustrates a schematic diagram of an embodiment of an optical disk recording and reproduction apparatus of the present invention.

FIG. 7 illustrates a schematic diagram of an embodiment of an optical disk recording and reproducing apparatus according to the present invention. As shown, an AV encoder 9 receives and encodes audio and video data. The AV encoder 9 outputs the encoded audio and video data along with coding information and stream attribute information. A multiplexer 8 multiplexes the encoded audio and video data based on the coding information and stream attribute information to create, for example, an MPEG2 transport stream. A source packetizer 7 packetizes the transport packets from the multiplexer 8 into source packets in accordance with the audio/video format of the optical disk. As shown in FIG. 7, the operations of the AV encoder 9, the multiplexer 8 and the source packetizer 7 are controlled by a controller 10. The controller 10 receives user input on the recording operation, and provides control information to AV encoder 9, multiplexer 8 and the source packetizer 7. For example, the controller 10 instructs the AV encoder 9 on the type of encoding to perform, instructs the multiplexer 8 on the transport stream to create, and instructs the source packetizer 7 on the source packet format. The controller 10 further controls a drive 3 to record the output from the source packetizer 7 on the optical disk.

The controller 10 also creates the navigation and management information for managing reproduction of the audio/video data being recorded on the optical disk. For example, based on information received via the user interface (e.g., instruction set saved on disk, provided over an intranet or internet by a computer system, etc.), the controller 10 controls the drive 3 to record the data structure of FIG. 2, 3, 5 or 6 on the optical disk.

During reproduction, the controller 10 controls the drive 3 to reproduce this data structure. Based on the information contained therein, as well as user input received over the user interface (e.g., control buttons on the recording and reproducing apparatus or a remote associated with the apparatus), the controller 10 controls the drive 3 to reproduce the audio/video source packets from the optical disk. For example, the user input may specify a path to reproduce. This user input may be specified, for example, via a menu based graphical user interface preprogrammed into the controller 10. Using the user input and the path management information reproduced from the optical disk, the controller 10 controls the reproduction of the specified path.

For example, to execute an angle change, a user inputs a request for an angle change via the user interface into the controller 10. The controller 10 then determines the number of reproduction paths, and that the user has requested an angle change. The controller 10 also determines if the user's request is permitted by referencing the EP map. Depending on the information stored in the EP map, the change angle request may be immediately processed, delayed and/or refused.

The reproduced source packets are received by a source depacketizer 4 and converted into a data stream (e.g., an MPEG-2 transport packet stream). A demultiplexer 5 demultiplexes the data stream into encoded video and audio data. An AV decoder 6 decodes the encoded video and audio data to produce the original audio and video data that was fed to the AV encoder 9. During reproduction, the controller 10 controls the operation of the source depacketizer 4, demultiplexer 5 and AV decoder 6. The controller 10 receives user input on the reproducing operation, and provides control information to AV decoder 6, demultiplexer 5 and the source packetizer 4. For example, the controller 10 instructs the AV decoder 9 on the type of decoding to perform, instructs the demultiplexer 5 on the transport stream to demultiplex, and instructs the source depacketizer 4 on the source packet format.

Figure 8:
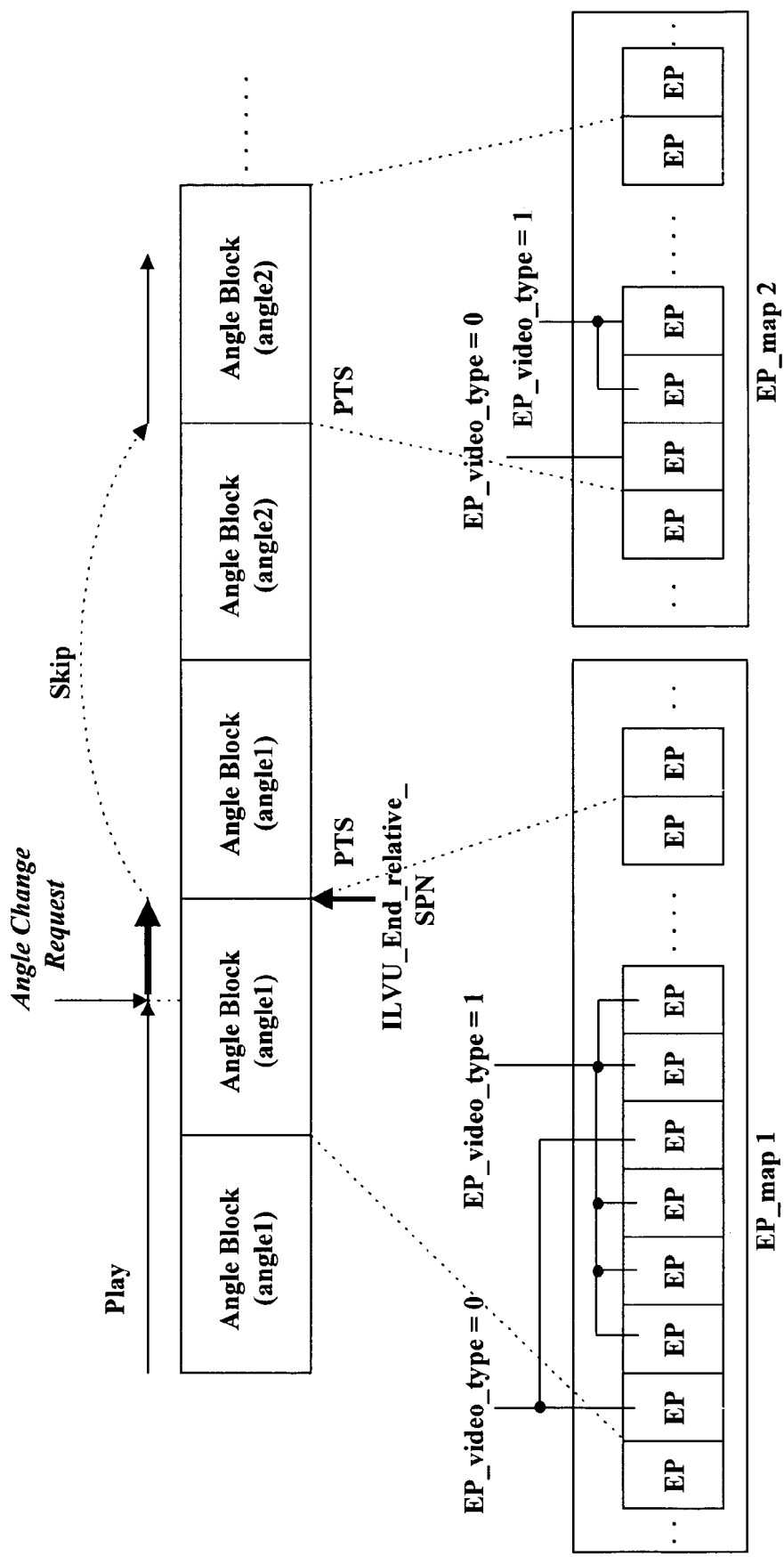
FIG. 8 illustrates a multi-angle playback process based on a search information management method for a high-density optical disk in accordance with the present invention.

While FIG. 7 has been described as a recording and reproducing apparatus, it will be understood that only a recording or only a reproducing apparatus may be provided using those portions of FIG. 8 providing the recording or reproducing function.

FIG. 8 illustrates application of the described data management system for executing an angle change by detecting a flag recorded in the EP_map_for_one_stream_PID. As shown in FIG. 8, multiple reproduction path data are recorded in the unit of Angle Block which is divided by the fourth condition of FIG. 6 in which the PTS_EP_fine and the SPN_EP_fine have the values that correspond to the Angle Change (or AC) or the Interleaved Unit end relative source packet number (ILVU_end_relative_SPN). The data for one reproduction path are recorded as one or more Angle Blocks, and the Angle Blocks are interleaved.

When a user requests an angle change to a second angle Angle 2 while playing the data stream of a first angle Angle 1, an angle change may only be executed when a predetermined condition exists for selected parameters as recorded in the EP map as discussed in detail below.

In this example, upon receiving the angle change request, the system review the EP map to determine if the angle change request is permitted. By comparing the address information for the audio/video stream with the information stored in the EP, the system determines that address information does not correspond to condition 4 in FIG. 6, i.e., the angle change request does not occur at permitted angle point. As illustrated in FIG. 8, the angle change request is delayed until the system reaches the end of the Angle Block, and condition 4 of FIG. 6 is met, that permits processing of the angle change. Upon execution of the angle change request, the system skips to Angle Block 2 in the A/V stream to the SPN_start address for the requested angle, in this case, the second data block of Angle Block (Angle 2).

Although the detailed description of the invention has been directed to certain exemplary embodiments, various modifications of these embodiments, as well as alternative embodiments, will be suggested to those skilled in the art. The invention encompasses any modifications or alternative embodiments that fall within the scope of the claims.

What is claimed is:

1. A recording medium storing a data structure for managing reproduction of at least video data having multiple reproduction paths by a reproducing apparatus, comprising:
    one or more information files for managing reproduction of the video data having multiple reproduction paths, the video data being stored in one or more clip files, each information file associated with one of the clip files, each clip file of the multiple reproduction paths being associated with one of the multiple reproduction paths, said information file including at least one entry point map, the entry point map mapping a presentation time stamp to an address in the video data for at least one entry point,
    wherein the entry point map includes an entry point fine table including fine information of the at least one entry point and an entry point coarse table including coarse information of the at least one entry point, the fine information and coarse information identifying the presentation time stamp and the address, and the coarse information including identification information for referencing a corresponding fine information, the entry point map having angle change information associated with the entry point,
    wherein said angle change information indicates whether an angle change is permitted or not, and the angle change information further indicates where the angle change is permitted if the angle change is permitted, the angle change from a current angle to a requested angle is performed if the angle change is permitted, and the current angle is maintained until a position at which exit of the current angle is permitted.

2. The recording medium of claim 1, wherein the angle change information corresponds to each of a plurality of video data blocks, each video data block including at least one entry point, said information file includes a start point of a presentation time stamp, said start point of a presentation time stamp is corresponding to one of said plurality of video data blocks.

3. The recording medium of claim 1, wherein said information file includes source packet identification information for a corresponding one of plurality of video data blocks including at least one entry point.

4. The recording medium of claim 1, wherein said information file includes an indicator for indicating a stream type information of the video data.

5. The recording medium of claim 1, wherein said information file includes offset information regarding I-picture pointing to an address of a last I-picture contained.

6. The recording medium of claim 1, wherein said angle change information corresponds to each of a plurality of video data blocks and the angle change information includes the address of the last interleaved video unit in the corresponding video data block, each video data block including at least one entry point.

7. The recording medium of claim 1, wherein the fine information identifies least significant bits of the presentation time stamp and the address of the entry point and the coarse information identifies most significant bits of the presentation time stamp and the address of the entry point.

8. The recording medium of claim 1, wherein the entry point map includes the entry point fine table and the entry point coarse table to reduce the size of the entry point map and to improve searching performance while reproducing the video data, and the number of entries in the entry point coarse table is less than the number of entries in the entry point fine table.

9. A method of recording a data structure for managing reproduction of at least video data having multiple reproduction paths on a recording medium, comprising:

generating one or more information files for managing reproduction of the video data having multiple reproduction paths, the video data being stored in one or more clip files, each information file associated with one of the clip files, each clip file of the multiple reproduction paths being associated with one of the multiple reproduction paths, said information file including at least one entry point map, the entry point map mapping a presentation time stamp to an address in the video data for at least one entry point, wherein the entry point map includes an entry point fine table including fine information of the at least one entry point and an entry point coarse table including coarse information of the. at least one entry point, the fine information and coarse information identifying the presentation time stamp and the address, and the coarse information including identification information for referencing a corresponding fine information, the entry point map having angle change information associated with the entry point, wherein said angle change information indicates whether an angle change is permitted or not, and said angle change information further indicates where the angle change is permitted if the angle change is permitted, the angle change from a current angle to a requested angle is performed if the angle change is permitted and the current angle is maintained until a position at which exit of the current angle is permitted; and recording the information file on the recording medium.

10. The method of claim 9, wherein said generating step includes encoding at least video data and multiplexing at least video data to create a transport stream.

11. The method of claim 10, wherein said generating step further includes packetizing the transport stream into source packets in accordance with a format of optical disk.

12. A method of reproducing a data structure for managing reproduction of at least video data having multiple reproduction paths recorded on a recording medium, comprising:

reproducing one or more information files from the recording medium, the information file for managing reproduction of the video data having multiple reproduction paths, the video data being stored in one or more clip files, each information file associated with one of the clip files, each clip file of the multiple reproduction paths being associated with one of the multiple reproduction paths, said information file including at least one entry point map, the entry point map mapping a presentation time stamp to an address in the video data for at least one entry point, wherein the entry point map includes an entry point fine table including fine information of the at least one entry point and an entry point coarse table including coarse information of the at least one entry point, the fine information and coarse information identifying the presentation time stamp and the address, and the coarse information including identification information for referencing a corresponding fine information, the entry point map having angle change information associated with the entry point, wherein said angle change information indicates whether an angle change is permitted or not, and said angle change information further indicates where the angle change is permitted if the angle change is permitted; and controlling reproduction of the video data having multiple reproduction paths according to the information file, the angle change from a current angle to a requested angle is performed if the angle change is permitted and the current angle is maintained until a position at which exit of the current angle is permitted.

13. The method of claim 12, wherein the controlling step includes analyzing the angle change information if the angle change is requested via an interface, and selectively changing the reproduction path based on the analyzed angle change information.

14. The method of claim 12, wherein the controlling step includes ignoring the request for the angle change, if the request for the angle change is not permitted.

15. An apparatus for recording a data structure for managing reproduction of at least video data having multiple reproduction paths on a recording medium, comprising:

a recording unit configured to record data on the recording medium; and a controller, operably coupled to the recording unit, configured to control the recording unit to record one or more information files on the recording medium, the information file for managing reproduction of the video data having multiple reproduction paths, the video data being stored in one or more clip files, each information file associated with one of the clip files, each clip file of the multiple reproduction paths being associated with one of the multiple reproduction paths, said information file including at least one entry point map, the entry point map mapping a presentation time stamp to an address in the video data for at least one entry point, wherein the entry point map includes an entry point fine table including fine information of the at least one entry point and an entry point coarse table including coarse information of the at least one entry point, the fine information and coarse information identifying the presentation time stamp and the address, and the coarse information including identification information for referencing a corresponding fine information, the entry point map having angle change information associated with the entry point, wherein said angle change information indicates whether an angle change is permitted or not, and said angle change information further indicates where the angle change is permitted if the angle change is permitted, wherein the angle change from a current angle to a requested angle is performed if the angle change is permitted and the current angle is maintained until a position at which exit of the current angle is permitted.

16. The apparatus of claim 15, wherein the angle change information corresponds to each of a plurality of video data blocks, each video data block including at least one entry point, the entry point map for accessing the corresponding video block, the entry point map having one or more entry points corresponding to one of said plurality of video data blocks, the video data block including at least one entry point.

17. The apparatus of claim 15, said recording unit comprising:
a recording unit including a pickup unit to record the data on the recording medium.

18. The apparatus of claim 17, wherein said recording unit further comprises:
an encoder configured to encode at least video data;
a multiplexer configured to multiplex at least video data to create a transport stream; and
a packetizer configured to packetize the transport stream from the multiplexer into source packets in accordance with a format of an optical disk, said packetizer is controlled by the controller.

19. An apparatus for reproducing a data structure for managing reproduction of at least video data having multiple reproduction paths recorded on a recording medium, comprising:
a reproducing unit configured to reproduce data recorded on the recording medium; and
a controller, operably coupled to the reproducing unit, configured to control the reproducing unit to reproduce one or more information files from the recording medium, and to control the reproducing unit to reproduce the video data based on the information file, wherein the information file is for managing reproduction of the video data having multiple reproduction paths, the video data are stored in one or more clip files, each information file is associated with one of the clip files, each clip file of the multiple reproduction paths is associated with one of the multiple reproduction paths, wherein said information file includes at least one entry point map, and the entry point map maps a presentation time stamp to an address in the video data for at least one entry point, wherein the entry point map includes an entry point fine table including fine information of the at least one entry point and an entry point coarse table including coarse information of the at least one entry point, the fine information and coarse information identifying the presentation time stamp and the address, and the coarse information including identification information for referencing a corresponding fine information, the entry point map having angle change information associated with the entry point, said angle change information indicates whether an angle change is permitted or not, and said angle change information further indicates where the angle change is permitted if the angle change is permitted, wherein, the controller is configured to further control the reproducing unit to reproduce a requested angle based on the angle change information, if the angle change from a current angle to the requested angle is permitted, after reproducing the current angle until a position at which exit of the current angle is permitted.

20. The apparatus of claim 19, wherein said controller is configured to analyze the angle change information if the angle change is requested via an interface, and control the reproducing unit to selectively change the reproduction path based on the analyzed angle change information, the angle change information including at least one indicator for indicating whether the angle change is permitted or not.

21. The apparatus of claim 19, wherein said controller is configured to reference the entry point map within the information file to determine if a request for the angle change is permitted or not, the entry point map including one or more entry points.

22. The apparatus of claim 19, wherein said controller is configured to control the reproducing unit to ignore a request for the angle change, if the request for the angle change is not permitted.

23. The apparatus of claim 19, wherein the angle change information corresponds to each of a plurality of video data blocks,
the controller is configured to control the reproducing unit to delay the angle change until a reproduction position reaches to the end of the video data block.

24. The apparatus of claim 19, further comprises a user interface for receiving the request for the angle change from a user,
wherein the controller operably coupled to the user interface, is configured to perform the angle change based on the received request through the user interface.

25. The apparatus of claim 19, wherein the reproducing unit includes a pickup unit to reproduce the data from the recording medium.

* * * * *